Feb. 1, 1966  KIYOSHI INOUE  3,232,085
MACHINING APPARATUS UTILIZING ELECTRO DISCHARGE PRESSURE
Filed July 6, 1960  4 Sheets-Sheet 3

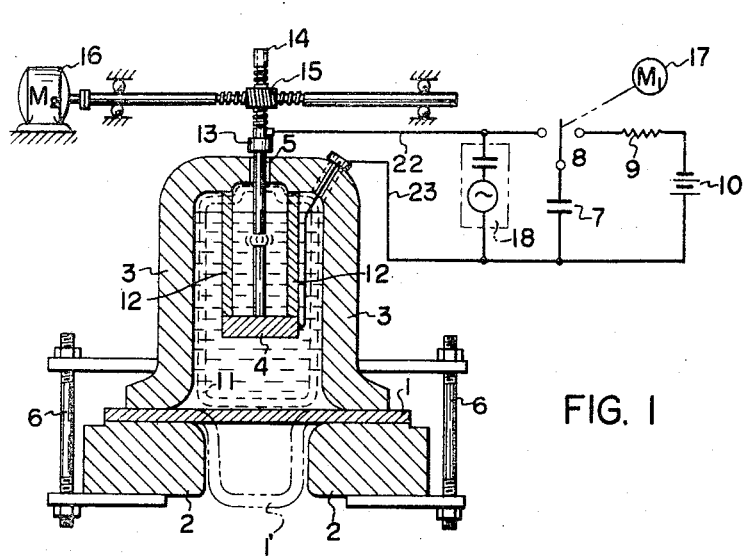
FIG. 1
FIG. 2
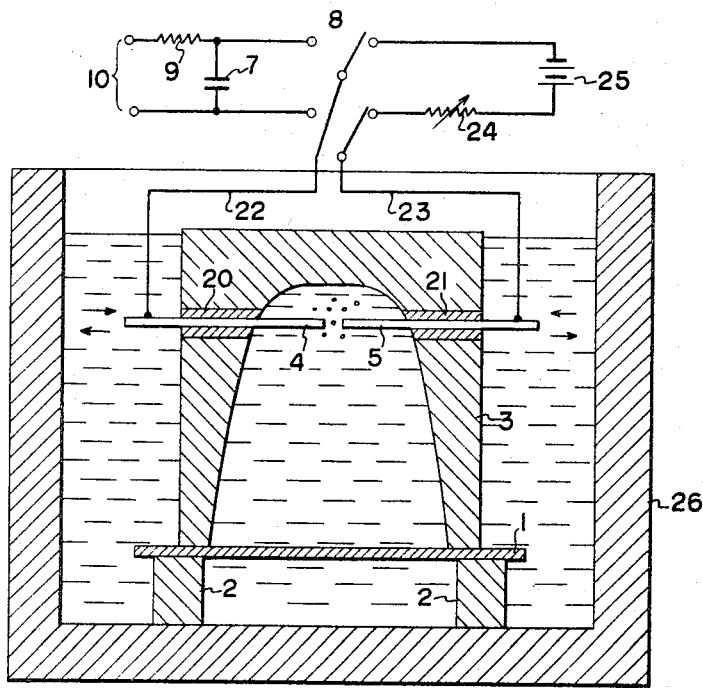

United States Patent Office 3,232,085
Patented Feb. 1, 1966

3,232,085
MACHINING APPARATUS UTILIZING ELECTRO DISCHARGE PRESSURE
Kiyoshi Inoue, 182 3-chome Tamagawa-yogamachi, Setagawa-ku, Tokyo, Japan
Filed July 6, 1960, Ser. No. 41,080
Claims priority, application Japan, Aug. 31, 1959, 34/27,784, 34/27,785; Sept. 7, 1959, 34/28,582; Oct. 17, 1959, 34/32,859; Dec. 26, 1959, 34/66,857; Dec. 30, 1959, 34/41,473, 34/41,474, 34/41,475; Jan. 11, 1960, 35/782
1 Claim. (Cl. 72—56)

The present invention relates to a machining apparatus in which an electric-discharge pressure is utilized, and particularly a machining apparatus in which the liquid-pressure wave, produced by an electro discharge in liquid, is used for shaping a work piece.

In conventional so-called "press machining," a high pressure fluid is usually produced by pump or the like and a work-piece is conformed the shape of a die by pressing it against the die of a definite shape under said fluid pressure. In order to shape a plate into its final configuration by such press machining, the press machining is usually affected in a plurality of operations so that the final shape is gradually approached. This is necessary to avoid producing abrupt large internal stress in the work piece. However, this results in a complicated process because of the replacement of the dies for each step of the process.

Without utilizing conventional high-pressure fluid, the present invention aims at the realization of a press-type of shaping wherein an electric discharge pressure, principally produced by discharge spark in an insulating liquid, is utilized for press machining, and if desired, a shearing of the work piece can be effected by discharging said pressure through a slit. The term "insulating liquid" refers to a liquid of low electrical conductivity. It will be readily apparent to those skilled in the art to utilize a number of liquids falling within the above meaning and heretofore used as insulating mediums.

Here, by "discharge pressure" is meant a mechanical explosive force generated by the spark discharge between the electrodes in liquid, that is, a general designation of all the pressures as transmitted in the form of liquid pressure, including a partial evaporation of the electrodes themselves due to thermal energy generated by electro discharge, expansion pressure due to partial gasification of liquid, expansion pressure of gas occluded in liquid and unknown impulsive pressures generated in the course of electro discharge.

In the machining according to this invention, wherein the discharge pressure is utilized, the discharge pressure can be controlled by the electric energy imposed between the electrodes. Accordingly, if desired, the spark discharge between the electrodes may be divided into a plurality of discharges of smaller energy and by imposing these divided small discharges intermittently on the work piece, said work piece can be machined gradually to the final shape without receiving large internal stress. The work piece can also be machined to the final shape if desired in a single operation by imposing a high instant pressure to the workpiece due to great discharge energy. Moreover, in the machining according to this invention, it is unnecessary to use both a die and a punch together as is usual in the conventional press machining, since only a die is necessary for effecting desired machining.

It is an object of the present invention to provide an apparatus in which an electric-discharge pressure is utilized.

Another object of the invention is to provide, in the above-mentioned machining apparatus utilizing electro discharge pressure, an appropriate shape and construction of a discharge vessel for imposing the discharge pressure on the work to be machined.

A further object of the invention is to provide discharge electrode materials, construction of discharge electrodes and polarity of electric source to impose on said discharge electrodes, especially adapted for increasing a single discharge pressure.

Further detailed and particular objects will be apparent from the following descriptions with reference to the accompanying drawings wherein FIG. 1 represents an embodiment of the machining apparatus according to the invention, wherein the press work is performed by utilizing electric-discharge shaping;

FIG. 2 represents an embodiment showing an improved discharge vessel of the press machining apparatus wherein an electrolytic solution is used as operating liquid;

Figure 7B:
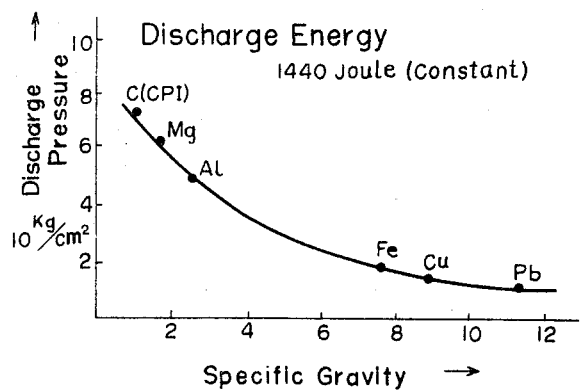
Figure 7A:
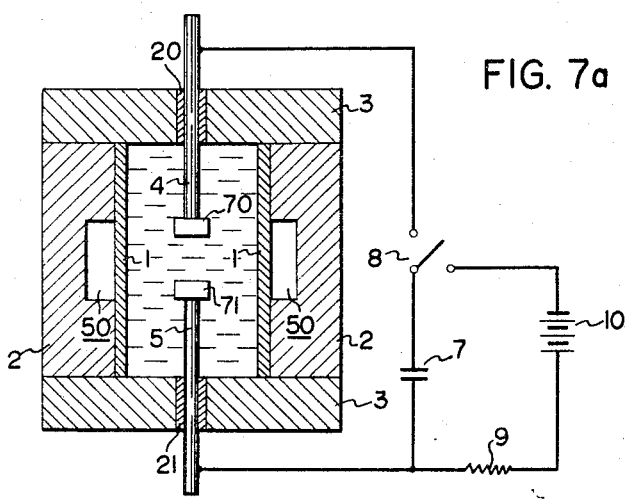
Figure 8A:
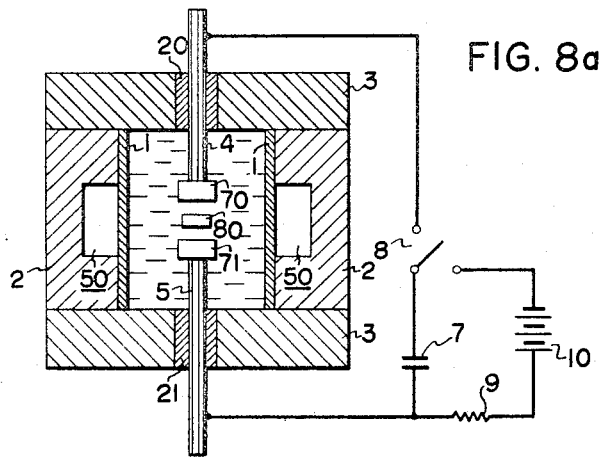
Figure 8B:
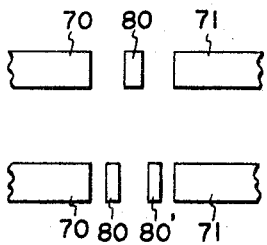
Figure 9A:
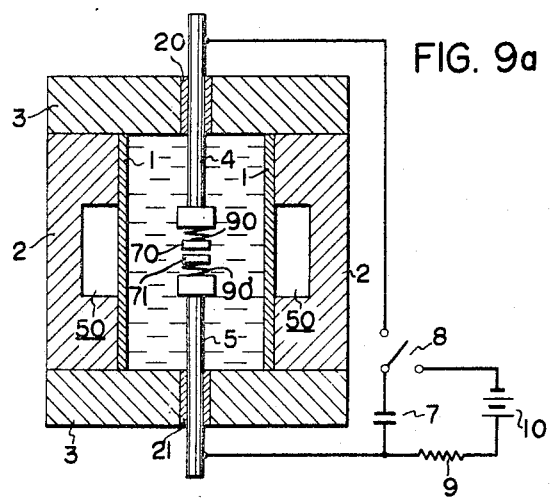
Figure 9B:
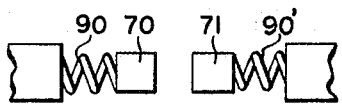
Figure 10:
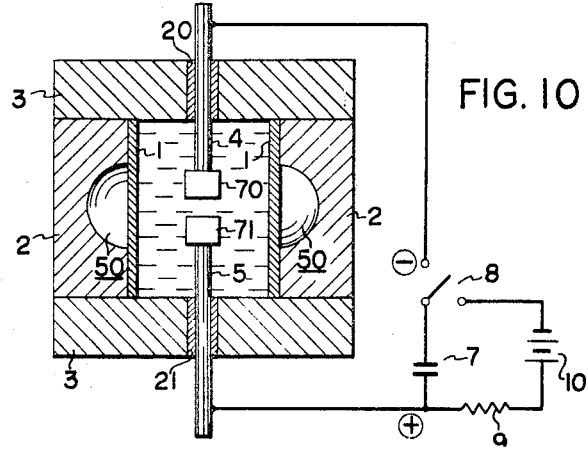

FIGS. 7a and 7b respectively show an apparatus for press shaping and a relationship between discharge pressure as a function of the material used for electrodes in FIG. 7a;

FIG. 8a shows an apparatus for press shaping and a construction of electro discharge electrodes particularly adapted to increase electro discharge pressure; and, FIG. 8b shows the electrodes in FIG. 8a in two variations thereof;

FIG. 9a represents another further improved example of the construction of electro discharge electrodes; and, FIG. 9b shows the electrodes in FIG. 9a in detail on an enlarged scale;

FIG. 10 is an embodiment of the press machining apparatus, particularly designed for increasing discharge pressure in consideration of special relations between materials and polarities of the discharge electrodes.

Referring to FIG. 1, a work piece 1 is mounted on a guide member 2 having a hollow cylindrical hole, and a hollow electro discharge vessel 3 is arranged on the guide member 2. Said guide member 2 and hollow electro discharge vessel 3 are clamped together with clamping members 6, with a work piece 1 in sheet form held therebetween. A rubber membrane 11 is provided in said hollow electro discharge vessel 3, for preventing outflow of liquid. Said rubber membrane 11 is filled with insulating liquid. Bar shaped electrode holders 12 project from the upper portion of said hollow electro discharge vessel 3 into the insulating liquid. At the lower end of said electrode holders 12, is arranged an electro discharge electrode 4. An electro discharge electrode 5 is inserted through a hole arranged on the top portion of said vessel 3. 4 and 5 are arranged opposite each other in the insulating liquid. The discharge electrode 5 is clamped by a chuck 13 and said chuck is secured to a screw-threaded bar 14. Said bar 14 is vertically movable by means of electric motor 16 through a gear 15, and thereby the discharge clearance between electrodes 4 and 5 can be continuously adjusted. The discharge electrodes 4 and 5 are connected by lead wires 22 and 23 to a discharge condenser 7 and a stationary contact point of changeover switch 8. The other stationary contact point changeover switch 8 is connected to said discharge condenser 7 through charging resistance 9 as well as D.C. source 10. The movable contact point of changeover switch 8 is connected with the other extremity of discharge condenser 7. When said movable contact is moved to the right in FIG. 1, said condenser is charged, and when the movable contact is moved to the left, the charge of the discharge condenser 7 is discharged toward electro discharge electrode 5. The movable contact of changeover switch 8 is switched to the left and right alternately by a changeover motor 17, and the changeover velocity of said switch 8 may be adjusted by changing the r.p.m. of said changeover motor 17. 18 is an auxiliary high frequency electrical source for facilitating the ignition of discharge electrodes, and said high frequency electrical source 18 is provided to be imposed beforehand between the discharge electrodes 4 and 5 for holding the discharge clearance at a condition, under which an electric discharge spark can be effected easily and immediately upon being imposed with electric charge of discharge condenser 7. The condenser 7 is charged by D.C. electric source 10 with a movable contact of change switch 8 moved to the right, and on the instant when the movable contact is brought down to the left, the electric charge thus stored in condenser 7 is discharged at the electrodes 4 and 5 in the insulating liquid. As a result, the insulating liquid around the discharge clearance is pushed aside instantaneously, and the gas occluded in the insulating liquid rapidly expands in high temperature caused by said electro spark discharge, and the insulating liquid itself is rapidly gasified and expanded. Besides, some unknown impulsive waves are also discharged from said discharge clearance.

All these pressures are transmitted through the insulating liquid in all directions from the discharge clearance, and imparts impulsive pressure to the walls of the electro discharge vessel 3. Though no permanent deformation is imparted to the walls of the electro discharge vessel 3 by said impulsive pressure, deformation stress is imparted to a plate work piece 1 arranged at the bottom of said discharge vessel 3, whereby said work piece is deformed as shown by dotted lines 1' in FIGURE 1 in a manner related to the magnitude of the impulsive pressure. In this case, the deformed shape of work piece depends on the external peripheral form of a hollow hole, by which the guide stand 2 is brought into contact with the work piece 1. When the charge stored in the electro discharge condenser 7 is relatively small, the spark discharge energy generated in the electro discharge clearance is small. Accordingly the impulsive pressure delivered in the insulating liquid is also relatively small and the deformation of work 1 is relatively small and the deformation stress imparted to work piece 1 each time is small. When the r.p.m. of changeover motor 17 increases, the electro charge imparted to the condenser 7 is small. Accordingly, the impulsive pressure imposed on work piece 1 at each electro charge is low and the work piece 1 is formed by a number of repetitions of the electro discharge. On the contrary, if the r.p.m. of changeover motor 17 lowers, the impulsive pressure imposed each time on the work piece 1 becomes high, and the forming will be finished by a smaller number of repetition of electro discharge. The degree of press-machining of work piece 1 can be defined by prior calibration of a tachometer mounted on the rotating shaft of said changeover motor 17.

The impulsive pressure due to electro spark discharge in the insulating liquid is imposed on the whole surface of the work piece perpendicularly thereto, and the work piece 1 is pressed against the work guide stand 2 having a predetermined shape. In the conventional press machining, a so-called model punch having corresponding convex face in compliance with concave face of guide stand is required in order to press a work piece into the guide stand. However, in the present invention, there is no such model punch required.

The apparatus shown in FIG. 2 is an improved electro discharge vessel of FIG. 1, wherein, instead of the above-mentioned insulating liquid, an electrolytic solution is used for performing an effective press machining, said solution being electrolyzed and thereby the gas occluded in said solution being increased and the electrolyzed gas being ignited and exploded by electro spark discharging. The said work piece 1 is placed on the guide stand 2, on which is further arranged a spark electro discharge vessel 3 having a paraboloidal opening.

The spark discharge electrodes 4 and 5 are oppositely inserted on the right and left sides of the upper portion of said spark electro discharge vessel 3 through insulating packings 20 and 21, thereby insulating electrically said spark electro discharge electrodes 4, 5 from the electro discharge vessel 3. The discharge electrodes 4 and 5 are connected to the movable contacts of double pole-double throw changeover switch 8 by lead wires 22 and 23 respectively. The left side stationary contacts of changeover switch 8 are connected respectively with both ends of the spark electro discharge condenser 7, and further connected to D.C. source 10 for electro discharging through charging resistance 9 in series. Furthermore, the right side stationary contacts of changeover switch 8 are connected to D.C. source 25 for electrolysis through variable resistance 24. The above-mentioned work piece 1, guide stand 2, discharge vessel 3 and discharge electrodes 4, 5 are all placed in an electrolytic solution tank 26. The said electrolytic solution tank 26 is filled with an electrically conductive liquid such as water generating combustible gas by electrolysis.

To begin with, the changeover switch 8 is thrown to the right FIG. 2 to connect D.C. source 25 for electrolysis with discharge electrodes 4 and 5. Then the electrolytic solution around electrodes 4, 5 is electrolyzed and thereby gasified.

The electrolysis may be controlled by the adjustment of variable resistance 24 as well as the adjustment of discharge electrodes 4 and 5 by shifting them in the directions of arrow. When the electrolyzed gas has gathered around discharge electrodes 4 and 5 to a certain amount, the changeover switch 8 is thrown to the left and the electric charge in the discharge condenser 7 is discharged at said discharge electrodes 4 and 5.

As a result, a spark electro discharge occurs between the discharge electrodes 4 and 5 through the electrolytic solution and a combustible gas is produced by electrolysis. The work piece 1 is machined in compliance with the shape of guide stand 2, under the impulsive liquid pressure produced by said discharge and ignition explosion of combustible gas.

The impulsive pressure due to this electro discharge is considered to have various causes as described before. In the apparatus shown here, since the electrolytic solution has been previously gasified by electrolysis, not only will the pressure be developed by the mechanical discharge pressure and the expansion pressure of the gas formed from the liquid by thermal energy as well as gases occluded in the liquid, but also the pressure of the ignition explosive force of the electrolyzed gas will be added, and thus the impulsive pressure becomes extraordinarily high and the efficiency of press-machining is remarkably increased.

Furthermore, if the discharge electrodes 4 and 5 are positioned near the focus of the paraboloidal cavity of electro discharge vessel 3, impulsive waves formed by the electrode spark discharge are imposed substantially at right angles to the surface of work piece 1. This means that the impulsive waves expanding at three dimensional angle of 4π can be utilized perfectly. Also in this apparatus, similar to the apparatus illustrated in FIG. 1, a plurality of electrolyses and electro discharges can be repeatedly effected, if desired.

Figure 3B:
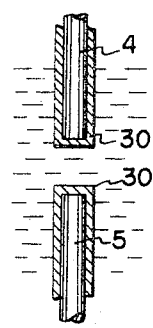
FIG. 3b shows the electrodes in FIG. 3a in detail on an enlarged scale.
Figure 3A:
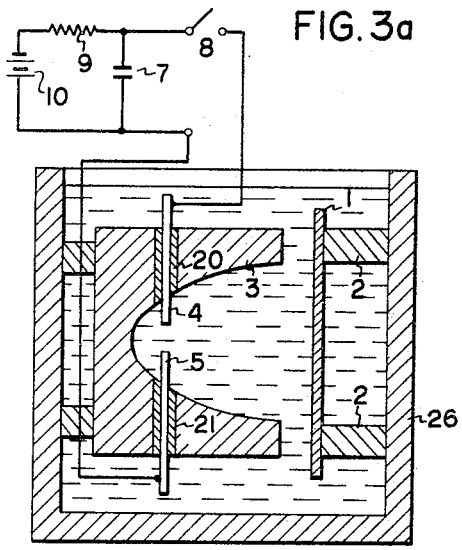
FIG. 3a is another embodiment of the press apparatus illustrating a construction of discharge electrodes especially adapted for increasing discharge pressure.

The apparatus illustrated in FIG. 3a is a machining apparatus of a horizontal type for the apparatus shown in FIG. 2 which is a vertical one. The liquid used is an insulating liquid as in the case of FIG. 1. In this example, the electro discharge voltage is designed to be raised by providing a thin insulating film over the surface of electro discharge electrodes, and thereby the impulsive pressure at the instant of electro spark discharges is effectively increased.

The work piece 1 is fixed on the side of guide stand 2 by any suitable means. The electro discharge vessel 3 having a paraboloidal hollow cavity is located opposite said work piece 1. Above and below the focus of said paraboloidal hollow cavity of the electro discharge vessel 3, the discharge electrodes 4 and 5 are oppositely inserted respectively through insulating packings 20 and 21 in such a manner that they may be insulated from the vessel 3 and also may be adjusted axially with respect to one another. The electro discharge electrodes 4 and 5 are connected with discharge condenser 7 as shown in FIG. 2 via switch 8. Moreover, said discharge tank 3 and work piece 1 are immersed in insulating liquid tank 26 filled with insulating liquid.

When the switch 8 is closed, the electric charge stored in electro discharge condenser 7 is discharged at the discharge electrodes 4 and 5, said discharge energy becoming an impulsive pressure and being imposed at right angles to the surface of work piece 1. The work piece 1 is press machined by said impulsive pressure according to the shape of guide member 2.

In such an apparatus, in order to convert the electro discharge energy into impulsive pressure effectively, is is necessary, prior to the electro discharge between the electrodes 4 and 5, to prevent leakage current from passing through the insulating liquid between said electrodes and simultaneously to impart a high voltage to said electrodes with a fixed clearance kept therebetween. The electric charge of the condenser 7 is decreased before the electro discharge, by said leakage current.

What is further, important, is that the energy stored in electro spark discharge condenser 7 is expressed by ½ CV², where C is the statical electric capacity, V is the magnitude of the voltage of the electrical source for electro spark discharge. However, when the leakage resistance between the electro discharge electrodes is low, the voltage of electrical source 10 can not be set as sufficiently high for charging the condenser 7 at high voltage. As a result, the highest value of discharge energy is unfavorably suppressed by the voltage of electrical source 10 for electro spark discharge.

If an insulating liquid having insufficient electrical resistance is used, such a disadvantage is remarkable, particularly when a switch of low resistance to voltage for heavy electric current is used as a switch 8.

As a step for removing this disadvantage, it is considered favorable to coat the surface of electro discharge electrodes 4, 5 with a thin insulating film 30 as illustrated in FIG. 3b.

By so doing, it becomes possible to reduce the leakage between the electro discharge electrodes 4, 5. Before closing the switch 8, the electro discharge clearance is kept sufficiently small, and the electric charge of condenser 7 which has been charged at a considerably high voltage is instantaneously discharged simultaneously with closure of switch 8. Accordingly, a high impulsive pressure is attained.

Of course, insulating film 30 is destroyed at the first discharge, and when the press machining is desired to be performed by a plurality of electro spark discharges, it is of course necessary to form such an insulating film 30 in each machining.

Figure 4:
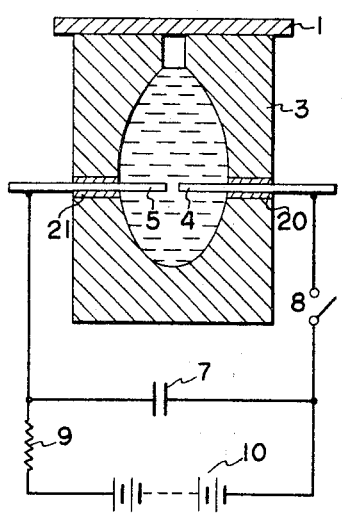
FIG. 4 represents a machining apparatus particularly adapted not only for press machining of work piece, but also for shearing of a work piece.

FIG. 4 illustrates an apparatus wherein the electro discharge energy generated in the insulating liquid is utilized not only for press machining, but also for a shearing operation. A sheet formed work piece 1 is placed at the open end of electro discharge vessel 3. Said electro discharge vessel 3 has a substantially ellipsoidal hollow cavity, at both sides of which the electro discharge electrodes 4, 5 are oppositely inserted through insulating packings 20, 21, thereby insulated from said vessel 3. Said electrodes 4 and 5 are connected respectively with both electro discharge condenser 7 through switch 8 in series. Furthermore, D.C. electrical source 10 for electro discharge is connected to both ends of above-mentioned electro discharge condenser 7 through charging resistance 9.

When electro discharge takes place between the discharge electrodes 4 and 5 in the apparatus of such a type, the impulsive waves of electro discharge energy as described above expand from the discharge clearance in all directions. However, in the study of the real strength of this impulsive wave, the following fact has been confirmed.

Namely, while the impulsive waves radicate from the electro discharge clearance in all directions, they are particularly intense in a plane perpendicular to the axial direction of electrodes 4, 5 passing between said electrodes 4 and 5. This has been confirmed by the fact that a cut-groove like hole is formed only on the part of the work piece 1 intersecting said perpendicular plane at the middle point between said electrodes 4, 5. The reason why the strong impulsive waves occur on the above plane has not been made clarified at the present. This phenomenon is not explained by the conventional idea of radial impulsive waves due to the expansion of gas. An impulsive pressure due to some thermal elastic wave caused by electro discharge energy should be considered. The apparatus in FIG. 4 is adapted to operate on a work piece 1 by the impulsive pressure which strongly appears on the vertical plane as referred to above.

Namely, when the electro discharge is effected across the discharge electrodes 4, 5, the mechanical pressure accompanied by said electro discharge and the impulsive pressure due to the expansion of gas by heat energy are transmitted as liquid pressure to operate on work piece 1 placed at the opening portion of said discharge vessel 3. The opening portion of said vessel 3 is provided in the form of a narrow slit on a plane perpendicular to the axis of electrodes 4 and 5 at the middle point between said electrodes. Therefore, the impulsive pressure due to discharge energy, together with another impulsive pressure due to thermal elastic wave on said vertical plane as mentioned above, are transmitted to the slit form opening portion of said discharge vessel, thereby imparting shearing stress to the work piece 1 on the slit form opening, and the work piece 1 is sheared along the above-mentioned slit opening. Depending on the size of slit form opening, not only the shearing of work piece, but also pressing can be performed.

Figure 5:
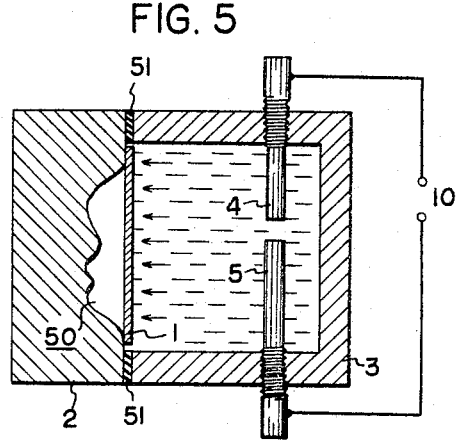
FIG. 5 represents a machining apparatus wherein the press machining for shaping work piece into a die is effected by continuous spark discharge.

FIG. 5 represents an apparatus wherein, a long arc discharge in insulating liquid between the electrodes is utilized for irregular surface press-machining. A sheet form work piece 1 is placed so as to cover a recess 50 having a desired irregular surface of guide member 2. The discharge vessel 3 is secured on the side of guide stand 2 in air tightness with packings 51, 51, and said discharge vessel 3 is filled with an insulating liquid which is easily gasified or of high volumetric expansion due to increase of temperature.

At one side of the electro discharge vessel 3, the discharge electrodes 4, 5 are secured on its upper and lower portions respectively, said discharge electrodes 4, 5 being connected with electrical source 10 for electro discharge. When ordinary A.C. or D.C. voltage is applied to said electrical source 10, a continuous electro arc discharge or a long period of time is effected between said electrodes 4 and 5. The temperature of discharge portion is extremely high, i.e. above 2500° to 3500° C. and the insulating liquid in the discharging clearance is gasified due to the above-mentioned high temperature, and said gas and also expanded liquid itself produce a liquid pressure pressing the work piece 1 into recess 50 of guide stand 2 in the direction of the arrows. In this case, insulating liquid is prevented from entering into recess 50, and said recess is kept in vacuum or filled with gas. When it is filled with gas, the electro discharge of electrodes 4 and 5 of course, accompanys the exhaust of said gas outward. In such surface press-machining, an insulating liquid which is easily gasifiable by heating, or an insulating liquid of a high thermal volumetric expansion is preferably used. By using such a liquid, a gradually increasing and substantially uniform liquid pressure can be applied to the surface of work piece 1, and thereby a precision machining for said high order surface can be expected. Of course, in such a high precision press machining, a continuous pulse voltage may be utilized for producing a continuous impulsive pressure for machining. In a press machining by such a continuous discharge pressure, the temperature of the insulating liquid rises, and an insufficient expansion of the gas occluded in the insulating liquid and gases generated by gasification is inevitably caused. Accordingly, it is preferable to renew the insulating liquid by cooled liquid.

Figure 6:
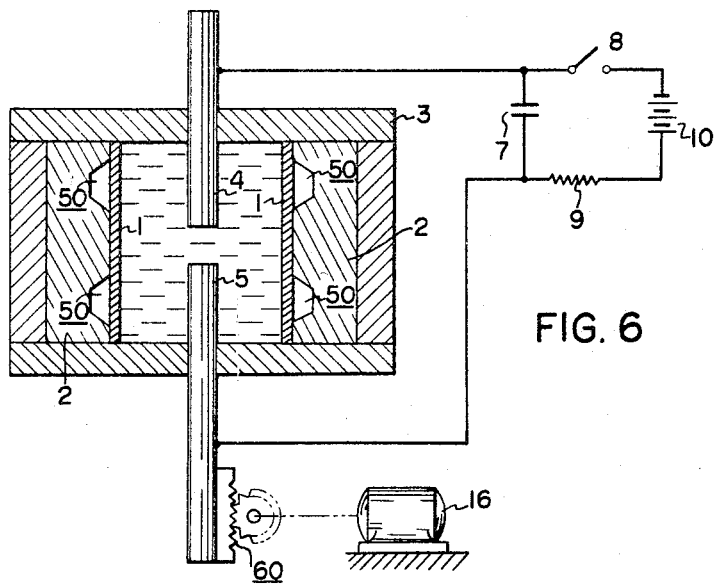
FIG. 6 illustrates another example of apparatus for press-shaping of work piece against a die, wherein the gap between electro discharge electrodes is adjustable.

The apparatus shown in FIG. 6 is another embodiment of the present press machining apparatus, wherein the discharge electrodes are set sufficiently apart excepting when electric discharge is performed, particularly for increasing discharge energy. The work pieces 1, 1 are closely attached to the surfaces of guide stands 2, 2 having recesses 50, 50 and arranged on both sides of the discharge vessel 3.

The discharge electrodes 4, 5 are arranged by penetrating through the discharge vessel 3 at its central portion. The hollow portion inside the discharge vessel 3 is filled with an insulating liquid. The discharge electrodes 4 and 5 are connected with discharge condenser 7, switch 8, charging resistance 9 and D.C. electrical source 10 for electro discharge as in the foregoing apparatus. The discharge electrode 5 is provided with rack and pinion 60 at its lower portion, and said rack and pinion 60 is driven by electro motor 16 for operating electrodes. By operation of the motor 16 for raising and lowering electrode 5, the distance between the electrodes 5 and 4 may be varied through said rack and pinion device 60.

In a device wherein an electro discharge energy is converted into a liquid pressure for the performance of press-machining, since the electrical energy stored in an electro discharge condenser is converted into energy for press machining, the increasing of electro discharge energy is necessary for increasing the working energy for press machining. Accordingly, for the same electrical statical capacity of discharge condenser, it is important to increase electric voltage of the electrical source for electro discharge. In particular, as the electric energy stored in the electro discharge condenser is directly proportional to the square of the charging voltage, it is desirable to increase the charging voltage. As with FIG. 3a, however, when the charging voltage becomes too high, the electro discharge energy will be lost, prior to electro discharge, due to the leakage between the electrodes. Accordingly, an insulating liquid having high leakage resistance is needed. If a switch is inserted in the discharge circuit for controlling the electro discharge between electrodes 4 and 5, an undesirable discharge is caused at this switch at the instant when said discharge circuit is closed, and not all of the electric charge stored in condenser 7 is effectively used for discharge energy between electrodes 4 and 5, since some of said energy is lost as a discharge at the switch. Moreover, in the ordinary switch, the contact parts are quickly worn out by this undesirable discharge. Thus, an ordinary switch can not work effectively. Further, due care should be paid to the fact that the passage of leakage current raises the temperature of the insulating liquid around the discharge clearance, and the gas contained in the liquid and gases produced by gasification expand gradually and the instantaneous discharge pressure does not become strong and high. Thus, by going to an arc discharge, an effective spark discharge can not be expected. Considering the above-mentioned disadvantages of this apparatus, the voltage of the discharge source is adapted to be raised for increasing the discharge energy as large as possible in this apparatus. In order to avoid the above-mentioned harmful energy loss, in this apparatus, the discharge clearance is adapted to be increased when the condenser is charged and prior to electro discharge, and the electro discharge is arranged to be effected at the instant when said discharge clearance has been adjusted to a predetermined minimum value. Namely, the electrode 5 is allowed to descend via rack and pinion 60 by operating the motor 16 when condenser 7 is charged, while on the other hand the discharge clearance is decreased by reverse rotation of motor 16 when the charging of condenser 7 is completed, for ensuring a rapid spark discharge. Furthermore, the relative vertical movement of the electrodes is not limited to the discharge electrode 5, but the electrode 4 or both electrodes 4, 5 can also be adapted to move vertically.

In the apparatus in FIG. 6, two work pieces 1, 1 can be pressed simultaneously at one press operation. Moreover, a plurality of work sheets can be press machined simultaneously on peripheral walls of the apparatus, if desired, by using a discharge vessel 3 of cylindrical or polygonal column form.

The illustration shown in FIG. 7a is of apparatus wherein suitable electrode material is provided for producing a larger discharge pressure, in considering the relationship between the impulsive discharge pressure produced by the spark discharge effected between the electrodes and the electrode material used. FIG. 7b shows the variation of impulse pressure relative to the electrode materials used. In the example shown in FIG. 7a, as in the foregoing press apparatus, the work piece 1 is secured adjacent the recess 50 of guide stand 2, and a hollow portion formed by discharge vessel 3 and 2 is filled with an insulating liquid. Discharge electrodes 4, 5 penetrate through the vessel 3, at its central portion, located oppositely each other at said hollow portion through the insulating liquid, and are connected in series respectively with change switch 8, discharge condenser 7, charging resistance 9 and D.C. source 10 for discharge.

If an electro discharge occurs in such an apparatus as just described between the discharge clearance, discharge energy is converted into liquid pressure which presses work pieces 1, 1 against recesses 50, 50 of guide stands 2, 2. This operation shows no particular difference from the cases of above-explained apparatus.

A particular difference in said apparatus is in the light metal pieces 70, which are attached to the tips of electrodes 4, 5 alternately, the electrodes 4, 5 may themselves be made of said light metal.

According to the present inventor's investigation, with the same capacity of discharge condenser, same charging voltage and same insulating liquid, the impulsive pressure produced by the electro discharge, i.e., the discharge pressure, has been determined to be inversely proportional to the specific gravity of the electrode material used. The same electrode material was used for both positive and negative poles. Thus, when the specific gravity of the electrode material is large, the discharge pressure acting as a liquid pressure is small, while on the contrary when the electrode material has a small specific gravity, the discharge pressure increases. FIG. 7b shows this result, wherein the specific gravity of electrode material is shown on the abscissa and the discharge pressure (kg./cm.$^2$) is shown on the ordinate, and the chemical symbols in the figure show the kinds of electrode material used. Namely, when copper (Cu) was used as the electrode, the discharge pressure was approx. 120 kg./cm.² When aluminum (Al) was used as the electrode, the discharge pressure was approx. 480 kg./cm.². The discharge energy imposed on the two above mentioned electrodes has been 1440 joules. The ratio of specific gravity of aluminum (Al) to copper (Cu) is about 3.3, while the discharge pressure is about 4 times as large for the aluminum.

The reason why the discharge pressure becomes large when a material of low specific gravity is used is not apparent. However, the following reason may be considered. The vaporization of electrode material under the same discharge energy has a large volumetric proportion in case of a material of lower specific gravity; and further, the powders of discharge electrodes dispersed into liquid from the discharge clearance by electro discharge will favorably act upon the gasification of insulating liquid and the rapid expansion of the gas thus formed. Namely, a large quantity of powders of electrodes dispersed in the liquid is considered to act effectively in the heating of liquid around the discharge point without being limited to the local discharge point. The electrode materials are not limited to the light metals as plotted in FIG. 7b, such as aluminum (Al), magnesium (Mg), etc. Even, non-metals such as carbon (C) may be used satisfactorily which are of low specific gravity and have electrical conductivity. Even alloys can be used satisfactorily, only when they satisfy the above-mentioned condition. The above explanation is only based on the magnitude of specific gravity. However, a substantially similar explanation can of course be made, with respect to the atomic weight which is in similar relation to the specific gravity, as well as with respect to the specific heat which has an inverse relationship thereto. Though it is not yet certain, the fusion point, boiling point, hardness, and various other factors such as an amount of consumption due to the same discharge energy as referred to above are considered to have a relationship with the discharge pressure generated. It is difficult to discuss the above generally. The material of the machining electrodes is not necessarily to be the same for the positive and negative poles, but a combination of different electrode materials may be also satisfactorily used. It is seen that by using an electrode of a low specific gravity in only one pole, the discharge pressure may be doubled.

FIG. 8a illustrates apparatus adapted to increase the discharge pressure by utilizing the vaporization and dispersion of discharge electrodes, wherein the discharge pressure is further increased by arranging an intermediate electrode between said discharge electrodes.

The apparatus shown in FIG. 8a has a construction substantially similar to FIG. 7, in which an intermediate electrode 80 is placed in the middle between the electrode materials 70 and 71 for the discharge electrodes 4 and 5. The manner in which the intermediate electrode is arranged is more clearly shown in FIG. 8b. Namely, one or two intermediate electrode or electrodes of sheet form is or are arranged in the middle portion of discharge electrode materials 70 and 71 by suitable means.

By such an arrangement, a part of electrode materials 70 and 71 is vaporized by high temperature generated in the course of electro discharge, thereby the gas occluded in the insulating liquid or gases generated by the gasification of the insulating liquid itself are rapidly expanded together. As described with respect to FIG. 7, a strong discharge pressure is then produced. In this apparatus, the discharge pressure is further increased by the vaporization of intermediate electrodes 80 or 80, 80' together with the electrode materials 70, 71, and moreover, in this case, a so-called discharge clearance is subdivided into two or three clearances, and the above-mentioned increase of discharge pressure will also be thereby influenced. Examples of experiment with the apparatus equipped with such intermediate electrodes are shown in the following table. As is apparent from said table, the discharge pressure can be approximately doubled.

| Experiment | (a) Intermediate electrode: 1 | (b) Intermediate electrode: 2 | (c) No intermediate electrode |
|---|---|---|---|
| Electrode used | Fe-Fe | Fe-Fe | Fe-Fe |
| Intermediate electrode | Cu | Cu | |
| Intermediate electrode, thickness (mm.) | 0.2 | 0.2 | |
| Discharge condenser capacity (μf.) | 7,000 | 7,000 | 7,000 |
| Charge, voltage | 700 | 700 | 700 |
| Charge energy (joules) | 1,700 | 1,700 | 1,700 |
| Discharge pressure (kg./cm.²) | 500 | 500 | 280 |

In the above, the discharge pressure was the same in the Examples (a) and (b) which is considered to result from the distance between the intermediate electrode materials or the distance between the latter and the electrones. FIG. 9a shows apparatus in which useless consumption of discharge pressure due to strong axial pressure imposed on the electrodes themselves at the instant of electro discharge is intended to be prevented. Namely, the discharge clearance is a source of discharge pressure, and moreover, as said clearance is extremely narrow, the discharge pressure produced in the form of impulsive waves or a portion thereof acts upon the electrode oppositely located to said clearance and useful discharge pressure exerting on work pieces is considered to be consumed and become small.

In this appartus, the discharge electrode materials 70 an 71 are held elastically by electrodes 4 and 5 by means of springs 90 and 90' as evident from FIG. 9b.

By so doing, when electro discharge is effected in the discharge clearance, the electrodes are prevented from having imposed thereon axially strong pressure by electro discharge. In the previous apparatus described, the discharge electrodes 4 and 5 receive an axial force at the instant of electro discharge, said force being converted to an impulsive force against discharge vessel 3, 3, which is lost energy when the discharge energy is converted into discharge pressure. It is one of the characteristics of the apparatus shown in FIG. 9a that the discharge pressure is intended to be increased by keeping said impulsive force against discharge electrodes 4 and 5 to a minimum.

By means of elastically secured electrode materials 70 and 71, the impulsive force produced at the discharge clearance is remarkably reduced, and the electrode materials 70 and 71 will disappear simultaneously with the electro discharge at said clearance, with the result that almost all the discharge pressure is efficiently transmitted to the work piece. As compared with that shown in FIG. 8 having an intermediate electrode inserted, the discharge pressure is further increased. The experiment showed that with a discharge condenser of 7,000 μf. and a charging voltage of 700 v., the discharge pressure rose to 560 kg./cm.². (During this experiment, springs 90 and 90' were broken at the instant of electro discharge, and discharge pressure of 480 kg./cm.² was obtained. The residual voltage of condenser 7 was 230 v. Thus, as discharge energy released was 1515 joules, converting it to discharge energy of 1700 joules the value of discharge pressure of 560 kg./cm.² was calculated.)

The value of discharge pressure of 560 kg./cm.² has an additional discharge pressure of about 60 k./cm.² as compared with that in the apparatus of FIG. 8a, showing that the impulsive pressure imposed to the discharge electrodes in FIG. 8a can be utilized as a liquid pressure in FIG. 9a. And as is evident from the above-mentioned experiment, in order to use discharge energy perfectly, the springs 90 and 90' are preferably made of unbreakable material, and even if they are broken, a discharge pressure substantially comparable to a discharge pressure of 500 kg./cm.² in the apparatus of FIG. 8a is obtainable and sufficiently usable for the present purpose.

In this case, precaution is needed not to impart any inductance to springs 90 and 90' per se inserted in the discharge circuit, because 70 and 71 are discharge electrode materials. If any inductance is present, the rise of electro discharge is oppressed and no instantaneous spark discharge is expected and the discharge pressure can not be used as an efficient impulsive pressure.

FIG. 10 represents an apparatus, wherein the discharge pressure is intended to be increased in view of the discharge electrode material and its polarity. As a result of the investigation on the relation between the discharge electrode materials 70 and 71 and the polarity of discharge, the following fact has been confirmed. Namely, if the different electrode materials are used respectively for positive and negative electrodes, the discharge pressure obtained in the case when the electrode material of low specific gravity is used for the positive discharge electrode and the material of high specific gravity is used for the negative electrode is of about double as compared with that obtained in the reverse case. This means that the discharge polarity cannot be neglected in view of the increase in the discharge pressure.

The results of the experiments are shown in the following table:

| | Electrode material | Polarity | Condenser capacity, μf. | Charge voltage | Discharge energy, joules | Discharge pressure, kg./cm². |
|---|---|---|---|---|---|---|
| Experiment 1 | Al/Pb | +/− | 7,000 | 700 | 1,700 | 620 |
| Experiment 2 | Al/Pb | −/+ | 7,000 | 700 | 1,700 | 330 |

The reason why high discharge pressure can be obtained by choosing a low specific gravity electrode material for the positive pole and a high specific gravity material for the negative pole can be explained simply as follows: In ordinary discharge machining apparatus, the positive electrode is generally consumed faster than the negative electrode. On the other hand, as apparent from the description in connection with FIG. 7b, the electrode material of low specific gravity is easily vaporized in large qauntity at the instant of electro discharge. From these facts, it is presumable that the more vaporization of low specific gravity electrode material on the positive side contributes to the increase of effective discharge pressure.

The preceding table indicates the use of both Al and Pb. However, the use of low specific gravity electrode materials for both electrodes may be effective to obtain larger discharge pressure.

Furthermore, in the process and apparatus for imparting deformation strain to the work pieces by utilizing discharge pressure of this type, it is presumable that the determination of discharge pressure would seriously be affected by the kind of insulating liquid used. So far, no satisfactory solution has been obtained as to which insulating liquid gives the largest discharge pressure. Generally speaking, the following can be desired: (1) more gas is included in the insulating liquid; (2) a large quantity of gas can be gasified gases showing more volumetric expansion; (3) the rate of volumetric expansion at high temperature is large; (4) the insulation liquid shows a small rate of volumetric contraction; and (5) the electric resistance of the liquid is high. In this case, such an apparatus as illustrated in FIG. 2 is an exception, wherein the combustible gas produced by electrolysis in the electrolysis solution is utilized.

Heretofore, various explanations have been given with respect to the process and apparatus for machining workpieces by utilizing the discharge pressure due to electro discharge in the liquid according to this invention, the following conclusion will be arrived at from these explanations for increasing the electro discharge:

(1) As for a discharge vessel, the discharge vessel having paraboloidal surface as shown in FIG. 2 and FIG. 3 is effective. However, in this apparatus it is difficult to machine a large number of work pieces simultaneously. From this point of view, a cylindrical or polygonal tubular discharge vessel as illustrated in FIG. 6 to FIG. 10 inclusive is effective.

(2) As for a discharge electrode, using discharge electrode of preferably high conductivity and low specific gravity and holding such discharge electrodes elastically as shown in FIG. 9a will be effective.

(3) In cases of different electrode materials being used for the positive and negative electrodes respectively, it is effective that an electrode material of low specific gravity is used for the positive side.

(4) For electro shearing of the work piece, a slit opening is preferably provided in a discharge vessel having an elliptical hollow cavity as shown in FIG. 4.

(5) From the point of view of discharging energy, it is quite reasonable that a large capacity discharge condenser and a high charging voltage are desirable for the electrical source device, and it is particularly desired in view of a higher charging voltage that the useless consumption of discharge energy is avoided prior to the electro discharge.

(6) Furthermore, it is desired that the leading wires from condenser to electrodes have the lowest possible inductance.

The substance of the present invention is by no means limited to the embodiments as referred to above, and is to be fully considered to be within the scope of claim described hereunder.

Having thus described in the foregoing in detail particularly in reference to the accompanying drawings, what is claimed:

Apparatus for the electric-discharge shaping of a workpiece, comprising:
    housing means containing a dielectric liquid in shock-wave-transmitting relationship with said workpiece;
    a die juxtaposed with said workpiece for shaping same upon deformation of said workpiece by a shock wave transmitted thereto through said liquid;
    first circuit means including capacitor means operatively connectable across said electrodes for discharging therethrough to generate a spark discharge across said gap and thereby produce said pressure waves in said liquid, a source of direct current connectable across said capacitor means for charging same, and switch means for alternately connecting said capacitor means with said electrodes and said source of direct current; and second circuit means connected with said electrodes for applying across said gap a high-frequency alternating current to reduce the direct-current breakdown voltage necessary to generate the spark discharges across said gap.

References Cited by the Examiner

UNITED STATES PATENTS

| | | | |
|---|---|---|---|
| 2,559,227 | 7/1951 | Rieber | 113—44 |
| 2,887,604 | 5/1959 | Bodine et al. | 340—12 |
| 3,163,141 | 12/1964 | Wesley et al. | 113—44 |

FOREIGN PATENTS 742,460  12/1955  Great Britain.

OTHER REFERENCES

Martin, E. A., "The Underwater Spark; An Example of Gaseous Conduction at About 10,000 Atmospheres," Univ. of Mich. Eng. Res. Inst., Ann Arbor, Michigan (UMN-2048-12-F), July 1956, pages 11, 12, 64, 173, and 174.

"Explosives Form Space Age Shapes," Steel, August 25, 1958, pages 82–86.

"Spark-Bomb Method Promises In-Plant Explosive Forming," Space Aeronautics, February 1960, pages 99–101.

"Hydrospark Forming Shapes Space-Age Metals," The Tool Engineer, March 1960, pages 81–86.

"Electrical Systems for Electrohydraulic Forming," The Tool Engineer, July 1960, page 142.

CHARLES W. LANHAM, *Primary Examiner.*

WHITMORE A. WILTZ, NEDWIN BERGER,
*Examiners.*